US005550954A

United States Patent [19]
Campbell et al.

[11] Patent Number: 5,550,954
[45] Date of Patent: Aug. 27, 1996

[54] IMAGE PROCESSING LOAD BALANCING FOR A HOST PROCESSOR WITH A CONNECTED BINARY LEVEL IMAGE PRINTER

[75] Inventors: Russell Campbell; Terrence M. Shannon; Burton H. Poppenga, all of Boise, Id.

[73] Assignee: Hewlett-Packard Company, Palo Alto, Calif.

[21] Appl. No.: 237,793

[22] Filed: May 4, 1994

[51] Int. Cl.⁶ .................................................. G06K 15/00
[52] U.S. Cl. .......................... 395/106; 395/112; 395/114
[58] Field of Search ..................................... 395/106, 101, 395/112, 114, 109

[56] References Cited

U.S. PATENT DOCUMENTS

| 4,905,097 | 2/1990 | Watanabe et al. | 358/456 |
|---|---|---|---|
| 4,922,349 | 5/1990 | Abe et al. | 358/443 |
| 4,992,955 | 2/1991 | Yabuuchi et al. | 358/456 |
| 5,270,805 | 12/1993 | Abe et al. | 358/500 |
| 5,283,664 | 2/1994 | Fujisawa et al. | 358/429 |
| 5,363,454 | 11/1994 | Udagawa et al. | 358/501 |
| 5,438,648 | 8/1995 | Takaoka et al. | 395/106 |

*Primary Examiner*—Mark R. Powell
*Assistant Examiner*—Tracy M. Legree

[57] ABSTRACT

Apparatus for processing and displaying binary pixel image data includes a printer for receiving image data and for presenting the image data as bilevel pixel values. The printer includes a processor for altering the received image data into an output image. A host processor stores multi-bit-per-pixel image data and further includes image processing software and data transmission circuitry coupled to the printer. The host processor compares the bilevel pixel data size and the multi-bit-per-pixel data size and, based upon a size relationship determined from the comparison, processes the multi-bit-per-pixel image data into bilevel pixel values in either the printer or the host processor so as to transmit the least amount of image data between the host processor and the bilevel printer.

13 Claims, 2 Drawing Sheets

IMAGE PROCESSING LOAD BALANCING FOR A HOST PROCESSOR WITH A CONNECTED BINARY LEVEL IMAGE PRINTER

FIELD OF THE INVENTION

This invention relates to conversion of multi-bit-per-pixel images to bilevel pixel images and, more particularly, to a system and method for determining if such an image conversion should be performed in a host processor or in a binary level pixel printer.

BACKGROUND OF THE INVENTION

A binary ("bilevel") level pixel printer produces an image using dots that are either full on or full off. So long as a bilevel printer is employed to print only text or line images, neither a host processor nor the printer need consider how best to reproduce a gray-scale image. If, however, the host processor is instructed to cause the bilevel printer to reproduce a multi-bit-per-pixel (color or gray scale) raster image, then a conversion of the multi-bit-per-pixel image to a bilevel image must be performed, either in the host processor or in the printer, to enable the image's reproduction on a media sheet. Some common sources of multi-bit-per-pixel image data are scanned pictures, color and gray scale drawings from software illustration packages and patterns generated by such software illustration packages.

Multi-bit-per-pixel image data includes two distinct parts: an image header and the image data. The image header contains information about the image data, such as its height, width, the number of bits-per-pixel and sometimes an image color palette. The image color palette is a table of red, green and blue (RGB) values which define the full range of primary colors available for use in the reproduction of the image. The image data includes the actual multi-bit-per-pixel data that defines the image. Such image data is stored as offsets into the color palette table.

Many prior art systems entirely process an image in the host processor and then transmit it for printing to an attached bilevel printer. The multi-bit-per-pixel image is prepared in the host processor; converted (if necessary) from color to gray levels, scaled to the size required by the connected printer, half-toned to a bilevel bit map, and then compressed and transmitted over an input/output port to the connected printer. Once in the printer, the image is decompressed, processed for printing and printed.

If the multi-bit-per-pixel image created in the host processor is the same "size" (i.e. number of bytes) as the bilevel image required for printing in the printer, conversion of the multi-bit-per-pixel image to a bilevel bit map can occur in either the host processor or the printer without affecting image transmission time between the host and printer. However, many host processors today configure their images based upon a 640 pixel wide by 480 pixel long display presentation. This equates to a 75 pixel per inch image resolution. By contrast, many bilevel image printers today operate at a 600 pixel per inch resolution level. As a result, a 75 multi-bit pixel per inch image stored by the host processor must be converted in either the host or the printer to 600 pixel per inch bilevel pixels for use in the printer. If image conversion takes place in the host processor, the large amount of binary data can create a substantial print delay while the image is being transmitted between the host processor and the printer.

An example will help in understanding this situation. Assume that the host processor assembles a 2 inch by 2 inch image at a 75 pixels per inch resolution. Further assume that there are 8 bits of gray value data per pixel. Thus, the 2 inch by 2 inch host image is represented by 22,500 bytes of binary data. When that host image is converted in the host to a bilevel pixel image for transmission to a bilevel printer, 180,000 bytes of binary data are required to represent the 2 inch by 2 inch image (at 600 pixels per inch). Considering that data is transmitted from a host processor to an attached printer at an approximate rate of 10,000 bytes per second, the transmission time of the bilevel image to the connected printer is approximately 14 seconds. Clearly, if the image is a full size image (e.g. 8"×11"), the time required for transmission is proportionately greater. The result is that a substantial delay is incurred to enable transmission of bilevel pixel image data between the host processor and the printer.

Accordingly, it is an object of this invention to provide an improved apparatus for processing and displaying bilevel image data wherein printer delays due to image transmission times are minimized.

It is another object of this invention to provide apparatus for processing and displaying bilevel image data which enables processing of multi-bit-per-pixel image data into bilevel image data at a location which achieves minimum image transmission times between a host processor and a connected printer.

SUMMARY OF THE INVENTION

Apparatus for processing and displaying binary pixel image data includes a printer for receiving image data and for presenting the image data as bilevel pixel values. The printer includes a processor for altering the received image data into an output image. A host processor stores multi-bit-per-pixel image data and further includes image processing software and data transmission circuitry coupled to the printer. The host processor compares the bilevel pixel data size and the multi-bit-per-pixel data size and, based upon a size relationship determined from the comparison, processes the multi-bit-per-pixel image data into bilevel pixel values in either the printer or the host processor so as to transmit the least amount of image data between the host processor and the bilevel printer.

DETAILED DESCRIPTION OF THE INVENTION

Figure 1:
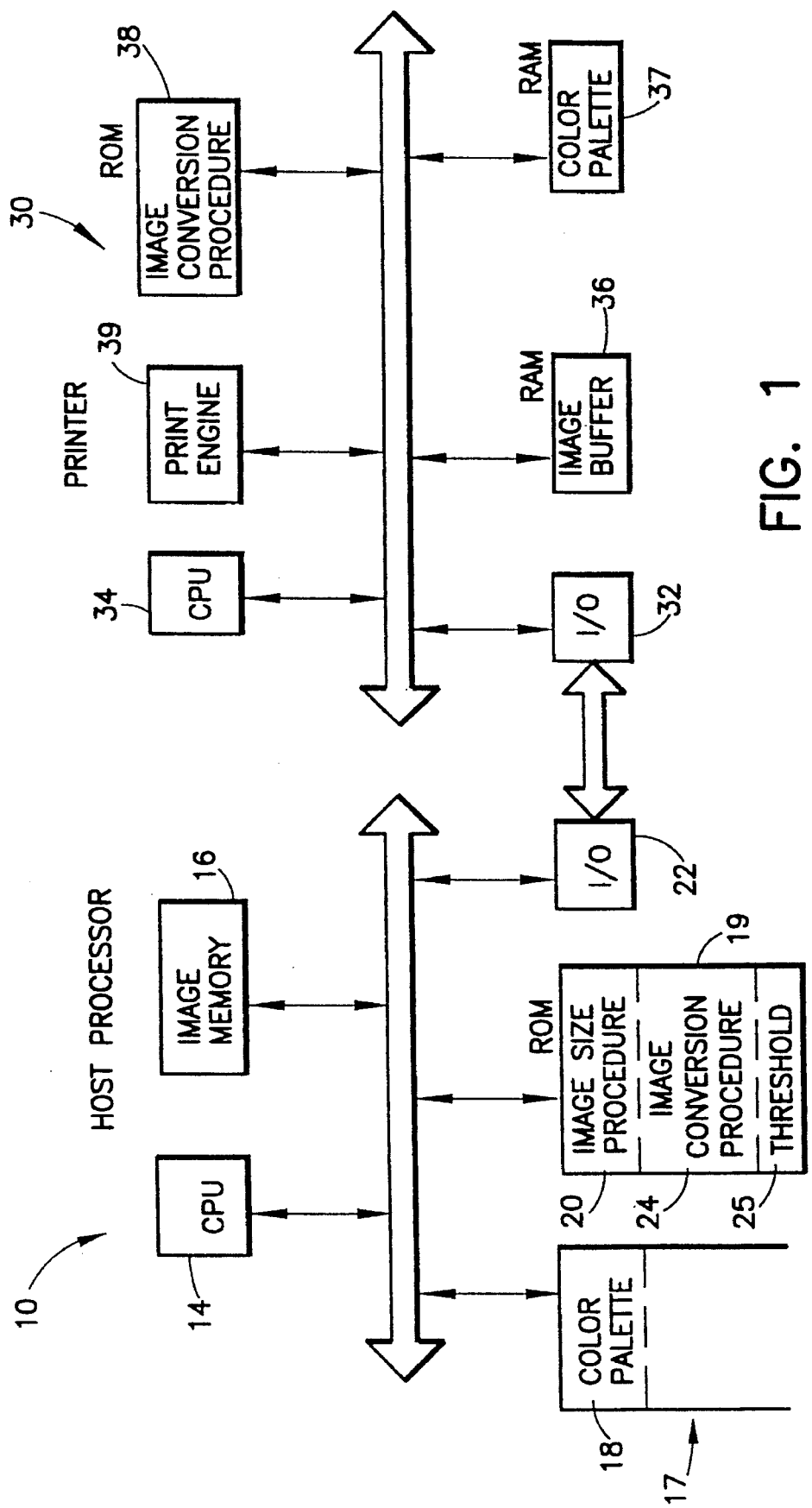
FIG. 1 is a high level block diagram of a host processor and connected binary pixel image printer adapted to perform the invention hereof.

The system shown in FIG. 1 examines a multi-bit-per-pixel image in a host processor's image memory and determines, adaptively, an appropriate location for conversion of the multi-bit-per pixel image into a bilevel pixel image. In some cases, the multi-bit-per-pixel image is sent to the printer for conversion to a bilevel pixel image and in other cases, the multi-bit-per-pixel image is reduced to a bilevel pixel image within the host processor before being sent to the printer. The primary basis for determining where to perform the image conversion is based upon a minimization of the data required to be transmitted over an I/O channel between the host processor and the bilevel printer.

Referring to FIG. 1, host processor 10 includes a central processing unit (CPU) 14 and a random access memory (RAM) 16 for storage of multi-bit-per-pixel image data. Each pixel in a multi-bit-per-pixel image is represented by a plurality of bits which define color values assigned to the pixel. A further portion 17 of RAM, includes a color palette 18, i.e. a table of red, green and blue values. Each color value in color palette 18 is represented by an 8 bit byte. If the multi-bit-per-pixel image stored in image memory 16 is comprised of three 8 bit bytes per pixel, then color palette 18 is unnecessary, as each pixel value includes sufficient data to fully represent the assigned red, green, and blue values. If, however, image memory 16 stores less than 3 bytes per pixel, each pixel's binary value is mapped into color palette 18 so as to enable an addressing of particular color values in accordance with the multi-bit pixel value.

A read only memory (ROM) 19 includes an image size procedure 20 which is utilized by CPU 14 to determine "image data sizes" of both a multi-bit-per-pixel image stored in RAM 16 and a corresponding bilevel image required by a connected printer 30. Based upon the size determination, a decision is made concerning where image conversion should be accomplished. ROM 19 also includes an image conversion procedure 24 which converts multi-bit-per-pixel image data to bilevel image data. ROM 19 further contains threshold data 25 which is used by image size procedure 20 in arriving at a decision as to where image conversion should occur. An input/output module 22 enables transmission of image data between host processor 10 and a printer 30.

Image data from I/O module 22 is transmitted via bus 29 to I/O module 32. Received image data is transferred out of I/O module 32 under control of CPU 34 to an image buffer 36. If multi-bit-per-pixel image data is received, it is stored in image buffer 36 for later conversion to bilevel pixel image data. A RAM 37 is provided to store a color palette if image conversion is to occur in printer 30. Such conversion occurs under the control of CPU 34 in conjunction with an image conversion procedure 38 stored in a ROM in printer 30. If bilevel image data is received from host processor 10, it is directly stored in image buffer 36 and is ready for immediate printing by print engine 39.

A host processor image data size is calculated by CPU 14 in accordance with the image size procedure stored in ROM 20. If the multi-bit values attributed to each pixel in image memory 16 are to be translated to bilevel pixel values in printer 30, the image transmitted to I/O module 22 will of necessity, include the contents of the color palette 18 in, RAM 17, in addition to the image data contained in image memory 16. Therefore, the image data size procedure calculates the data size of both the image data in image memory 16 and the size of the color palette 18 in RAM 17.

The image size calculation (in bytes) of the multi-bit-per-pixel image proceeds in accordance with equations 1 and 2:

$$\text{Image Size} = \frac{(\text{No. of Rows}) \cdot (\text{No. of Pixels/Row}) \cdot \text{Color Bits/Pixel}}{8 \text{ bits/byte}} \quad (1)$$

$$\text{Palette Size} = \frac{2^{\text{bits/pixel}} \cdot (3) \cdot (\text{bits/color})}{8 \text{ bits/byte}} \quad (2)$$

Equations 1 and 2 provide a measure in bytes of the data size of the multi-bit-per-pixel image. The image size procedure in ROM 20 also calculates the corresponding image data size for the bilevel pixel image required to enable printer 30 to print the image contained in image memory 16.

Based upon a comparison of the two calculated image data sizes, either an image conversion procedure 24 (in ROM 20) or an image conversion procedure contained in ROM 38 (within printer 30) is employed. More specifically, if the smallest image data size is the multi-bit-per-pixel image in host processor 10, then the multi-bit-per-pixel image is transmitted to printer 30 for image conversion. By contrast, if the bilevel image data size is smaller, image conversion takes place in host processor 10. In all cases, the least amount of data is transmitted between host processor 10 and printer 30.

In addition to calculating image data sizes of the multi-bit-per-pixel image stored in image memory 16 and the bilevel image data size, image conversion procedure 24 also calculates an image "gray" size.

The question to be answered by the calculated gray value is whether the image stored in image memory 16, after conversion to a gray value, will represent a smaller image data size than the bilevel pixel image required for printer 30. If that is the case, then the gray value image is transmitted, via I/O module 22 to printer 30. If the opposite is the case, then the gray value image is converted to a bilevel pixel image which is then transmitted to printer 30. In either case, the objective is to transmit the least amount of data between I/O module 22 and I/O module 32 so as to reduce the time lost in data transmission.

The gray value for each 3 byte pixel value is calculated by multiplying the pixel's red, green and blue byte values by selected percentages, i.e. A%, B% and C%, respectively. The resulting values are then summed to achieve a gray value for the pixel. While it is preferred that the values of A%, B% and C% are 30%, 59% and 11%, respectively, it will be understood by those skilled in the art that other percentage values may be employed so as to achieve pixel gray values of a different contextual makeup.

Once image data sizes are calculated, i.e. multi-bit-per-pixel image data size, binary pixel image data size, and gray value pixel image data size (where required), they are compared to determine which is smallest. Once the smallest image is found, it is then determined whether its image data size is smaller by a value that exceeds a threshold value 25 contained in RAM 19. If the value difference between the smallest image data size and the next larger image size does not exceed threshold value 25, then image conversion to bilevel image data values can occur in either host processor 10 or printer 30, depending upon factors other than transmission speed over bus 29.

For instance, if CPU 34 in printer 30 is a high performance processor and CPU 14 in host processor 10 is required for other processing procedures, then it will be preferred that the image conversion takes place in printer 30. By contrast, if CPU 34 in printer 30 operates more slowly than CPU 14 in host processor 10, it may be desirable to proceed with image conversion in host processor 10, followed by a subsequent transmission of bilevel pixel data to printer 30. Threshold value 25 is user-adjustable in accordance with the relative processing speeds of CPU's 14 and 34 so as to enable the image processing decision to be made on an adaptive basis—depending upon the relative performance capabilities of host processor 10 and printer 30, as well as demands upon their processing times.

Figure 2:
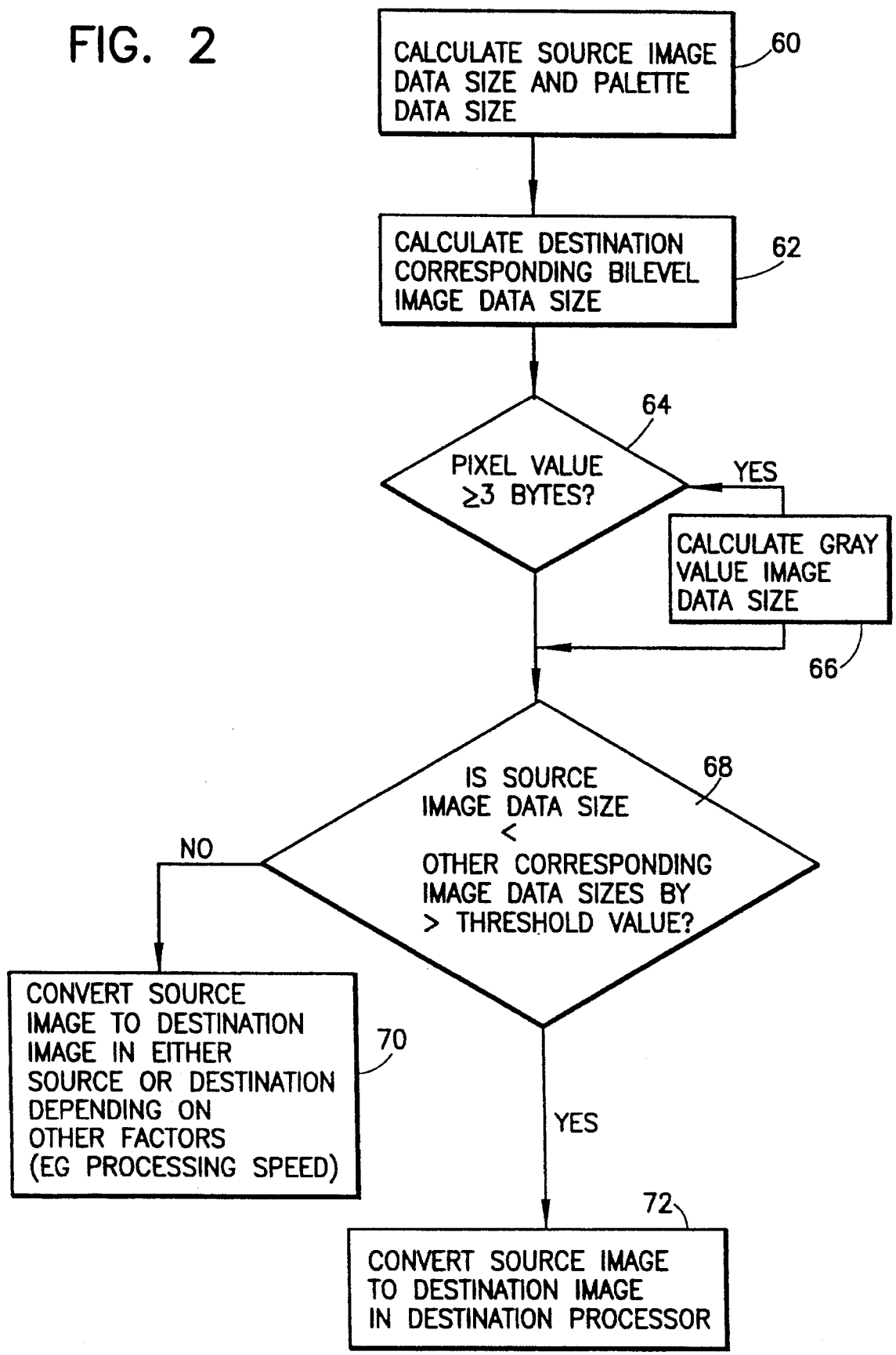
FIG. 2 is a logic flow diagram illustrating the operation of the host processor of FIG. 1 in determining an optimum location for conversion of a host processor-produced image into a bilevel pixel image.

Turning to FIG. 2, a logic flow diagram is shown which illustrates the method of the invention. Initially, host processor 10 causes its CPU 14, in combination with an image size procedure in RAM 19, to calculate a "source" image size, i.e. the size of the multi-bit-per-pixel image and palette data (box 60). Next, a destination image data size is calculated, i.e. the size of corresponding bilevel pixel image data, (box 62). The image data size values are stored and it is next determined whether the pixels of the multi-bit-per-pixel image in image memory 16 are represented by 24 or more bits per pixel (e.g. 3 color bytes or more per pixel). If yes, then a gray value image size is calculated as aforedescribed (box 66). If no, the gray value image is not required.

Next, the source image data size is compared to the other calculated image data sizes, and a determination is made as to whether the source image data size is smaller than the other image data sizes by greater than a threshold value (decision box 68). If the source image data size is not smaller than the other image data sizes by the threshold value, then the source image data may be processed to a binary image data at either the source or the destination, depending upon other factors (e.g. processing speed) (box 70).

If it is determined, that the source image data size is less than other image data sizes by at least the threshold value or greater, then it is determined that the image should be processed to a bilevel pixel image at the destination (box 72). This enables the smaller source image size to be transmitted between the source and destination—thus reducing the amount of data required to be transmitted.

It can thus be seen that if multi-bit-per-pixel image data size in host processor 10 is smallest, then the image is transmitted to printer 30, as is, and is there processed to bilevel pixel values. If either the bilevel pixel image or the gray scale image is found to be smallest, then the image is processed to a bilevel pixel image in host processor 10. This enables the least amount of data to be transmitted between the host processor and printer.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for processing and displaying binary pixel image data, comprising:

peripheral means for receiving image data and for presenting said image data as an output image comprising a matrix of bilevel pixel values in an image size of m rows by n pixels per row, said peripheral means including a processor for altering received image data into said output image; and source processor means for storing multi-bit-per-pixel image data of image size (x rows)·(y pixels per row)·(z bits per pixel), and including image processing means and data transmission means, said data transmission means coupled to said peripheral means, said source processor means comparing an image data size of said output image and an image data size of said multi-bit-per-pixel image, and based upon a size relationship determined from said comparing, processing said multi-bit-per-pixel image data into bilevel pixel values in either said peripheral means or source processor means so as to transmit, via said transmission means, a least amount of image data between said source processor means and said peripheral means.

2. The apparatus as recited in claim 1 wherein said image size relationship, as determined by said source processor means is which of said output image data size or said multi-bit-per-pixel image data size is smaller, and if said multi-bit-per-pixel image data size is smaller, transmitting said multi-bit-per-pixel image data to said peripheral means for conversion into a bilevel pixel image.

3. The apparatus as recited in claim 2 wherein if said output image data size is smaller than said multi-bit-per-pixel image data size, converting said multi-bit-per-pixel image data into bilevel pixel image data in said source processor means and transmitting said bilevel pixel image data to said peripheral means.

4. The apparatus as recited in claim 1 wherein said image data size of said multi-bit-per-pixel image includes data comprising a color palette that enables conversion of said Z bits into a color per pixel value.

5. The apparatus as recited in claim 4 wherein, if said Z bits per pixel comprise at least three byte color values, said source processor means further determines a gray value image data size for said multi-bit-per-pixel image, an image data size relationship as determined by said source processor means further considering said gray value image data size in determining where to process said multi-bit-per-pixel image data into bilevel pixel image data.

6. The apparatus as recited in claim 5 wherein a gray value is determined by said source processor means summing portions of said three color values for each pixel.

7. The apparatus as recited in claim 1, wherein an image size relationship as determined by said source processor means is which of said output image data size or said multi-bit-per-pixel image data size is smaller by an image data size value that is equal to or exceeds a predetermined threshold, and if said image data size of said multi-bit-per-pixel image is smaller by an image data size value equaling or exceeding a predetermined threshold value, transmitting said multi-bit-per-pixel image to said peripheral means for conversion to a bilevel pixel image.

8. The apparatus as recited in claim 7, wherein if said output image data size is determined to be smaller than the image data size of said multi-bit-per-pixel image by an amount greater than said threshold value, converting said multi-bit-per-pixel image into bilevel pixel values in said source processor means and transmitting said bilevel pixel values to said peripheral means.

9. The apparatus as recited in claim 8, wherein said source processor means further determines a gray value image data size for said multi-bit-per-pixel image, said image data size determination considering said gray value image data size in combination with said output image data size and said multi-bit-per-pixel image data size to determine which image data size is smaller than other image data sizes by a value greater than said determined threshold value, and only if said gray value image data size or multi-bit-per-pixel image data size is found to be smaller, transmitting said gray value image or multi-bit-per-pixel image, as the case may be, to said peripheral means for conversion to binary pixel values.

10. The apparatus as recited in claim 1, wherein said peripheral means is a bilevel pixel value printer.

11. A method for processing and displaying a bilevel pixel image and for minimizing the amount of data that is to be transmitted between a host processor and a connected bilevel pixel image printer, said method comprising the steps of:

calculating an image data size for a stored multi-bit-per-pixel image stored in said host processor;

calculating an image data size for a bilevel pixel image that corresponds to said multi-bit-per-pixel image stored in said host processor; and comparing said calculated image data sizes to determine if said image data size of said multi-bit-per-pixel image is smallest, and if so, transmitting said multi-bit-per-pixel image to said bilevel pixel image printer for conversion to bilevel pixel image data.

12. The method as recited in claim 11, further comprising the steps of:

converting said multi-bit-per-pixel image to a corresponding bilevel pixel image in said host processor if said image data size of said multi-bit-per-pixel image is larger than said bilevel pixel image data size; and transmitting said bilevel pixel image data to said printer.

13. The method as recited in claim 12, further comprising the steps of:

calculating a gray level pixel image data size for said multi-bit-per-pixel image; and determining which of said calculated image data sizes is smaller, and if either said gray level pixel image data size or said bilevel pixel image data size is found to be smallest, processing said smallest image data to a corresponding bilevel pixel image in said host processor.

\* \* \* \* \*